US 6,526,624 B2

(12) United States Patent
Miyamoto

(10) Patent No.: US 6,526,624 B2
(45) Date of Patent: Mar. 4, 2003

(54) BLOWER TUBE FOR AIR-JET TYPE CLEANER

(75) Inventor: Junichi Miyamoto, Togane (JP)

(73) Assignee: Maruyama Mfg. Co., Inc., Tokyo (JP)

( * ) Notice: Subject to any disclaimer, the term of this patent is extended or adjusted under 35 U.S.C. 154(b) by 0 days.

(21) Appl. No.: 09/925,750

(22) Filed: Aug. 9, 2001

(65) Prior Publication Data

US 2002/0104186 A1 Aug. 8, 2002

(30) Foreign Application Priority Data

Feb. 6, 2001 (JP) .................................. 2001-029891

(51) Int. Cl.[7] ................................................. A47L 9/08
(52) U.S. Cl. ......................... 15/414; 15/405; 15/415.1
(58) Field of Search ........................ 15/405, 414, 415.1

(56) References Cited

U.S. PATENT DOCUMENTS 2,586,145 A * 2/1952 Breuer et al. ............. 15/327.5
4,053,962 A * 10/1977 McDowell .................... 15/395
5,280,667 A * 1/1994 Coathupe ..................... 15/345
5,652,995 A * 8/1997 Henke et al. ................. 15/344
5,659,920 A * 8/1997 Webster et al. .............. 15/330
5,813,088 A * 9/1998 Wagner et al. ............. 15/327.5
6,076,231 A * 6/2000 Bucher ......................... 15/405

* cited by examiner

Primary Examiner—Chris K. Moore
(74) Attorney, Agent, or Firm—Rosenthal & Osha L.L.P.

(57) ABSTRACT

A blower tube connected to a blower of an air-jet type cleaner comprises a straight tube part having one end connected to the blower; and a deflecting part, extending from the other end of the straight tube part, for receiving an airflow within the straight tube part and deflecting thus received airflow. A nozzle for jetting out the airflow deflected by the deflecting part is defined in the straight tube part and deflecting part. The deflecting part does not protrude sideways from the straight tube part. In this configuration, the blower tube can be handled as if it is a straight rod-like body, and can be inserted into a narrow space for cleaning.

9 Claims, 7 Drawing Sheets

PRIOR ART

BLOWER TUBE FOR AIR-JET TYPE CLEANER

BACKGROUND OF THE INVENTION

1. Field of the Invention

The present invention relates generally to an air-jet type cleaner and, more particularly, is concerned with a blower tube in such a cleaner.

2. Related Background Art

An air-jet type cleaner is a kind of working machinery which jets out air from a blower tube by using a blower, so as to cause the resulting air jet flow to collect wastes such as fallen leaves at a desirable site, thereby carrying out cleaning.

Usually, when such a cleaner is used for blowing out wastes on the ground, an operator holds the base portion or proximal portion of the blower tube by hand, and tilts its front end portion or distal portion downward so as to direct the nozzle at the wastes. At this time, for efficiently blowing out wastes, it will be effective if the airflow jetted out of the nozzle of the blower tube is directed horizontally. Therefore, as shown in FIG. 1, a conventional blower tube 1 has a curved front end portion 2 in general.

When the front end portion 2 of the blower tube 1 is curved, however, it may be problematic in that the workable area is limited. For example, there are cases where the curved front end portion 2 of the blower tube 1 cannot be inserted into a narrow space between fences or walls, which makes it difficult to blow out wastes within the space.

The blower tube 1 is molded from a synthetic resin in general. When the front end portion 2 of the blower tube 1 is curved, it may be problematic in that the die for molding it becomes greater by the protrusion d of the front end portion 2, thereby raising the cost for the die.

Therefore, it is an object of the present invention to provide a blower tube for an air-jet type cleaner which can overcome the conventional problems mentioned above.

SUMMARY OF THE INVENTION

For achieving the above-mentioned object, the present invention provides a blower tube directly or indirectly connected to an air outlet of a blower in an air-jet type cleaner; the blower tube comprising a straight tube portion having one end connected to the air outlet of the blower; and a deflecting portion, extending from the other end of the straight tube portion, for receiving an airflow flowing through the straight tube portion and deflecting this received airflow away from a longitudinal axis of the straight tube portion; wherein a nozzle or an outlet for jetting out the airflow deflected by the deflecting portion is defined by the straight tube portion and deflecting portion; and wherein, with respect to a plane of projection orthogonal to the longitudinal axis of the straight tube portion, a projected image of the deflecting portion is encircled by a projected image of the straight tube portion.

In such a configuration, the deflecting part can deflect the airflow away from the longitudinal axis of the straight tube part so as to jet it out from the nozzle. Therefore, this blower tube has a function similar to that of the conventional blower tube having a curved front end portion. Further, since the deflecting part does not protrude sideways from the straight tube part in the present invention, the blower tube can be handled as if it is a straight rod-like body, whereby it can be inserted into a narrow space.

The form of the nozzle, i.e., the edge of straight tube and deflecting portions defining the nozzle, may be straight in a side-view state (see FIGS. 4 and 6). Also, in the side-view state, the edge defining the nozzle may be nonlinear and bent or curved in a direction opposite to the deflecting direction (see FIGS. 8, 10, and 12). In the latter case, the angle of emission of the airflow jetted out from the nozzle becomes wider than that in the former case. Here, "side-view state" refers to a state viewed along a direction perpendicular to the deflection direction of airflow caused by the deflecting portion and orthogonal to the longitudinal axis (A). In the drawings, FIGS. 4, 6, 8, 10, and 12 show the side-view state.

Preferably, the inner face of the deflecting portion is concave or planar.

Preferably, in the side-view state, the deflecting portion has a bend that reaches inward by a distance (W) which is at least ⅓ of the outer diameter (D) of the straight tube portion (See FIG. 4). This size makes it possible to reliably deflect the airflow at the flow rate of a typical airflow flowing through the blower tube, e.g., 60 to 80 m/s.

These and other features and advantages of the present invention will become apparent to those skilled in the art upon a reading of the following detailed description in conjunction with the drawings shown and described in the illustrative embodiments of the invention.

BRIEF DESCRIPTION OF THE DRAWINGS

In the course of the following detailed description, reference will be made to the attached drawings in which.

DESCRIPTION OF THE PREFERRED EMBODIMENTS

Figure 2:
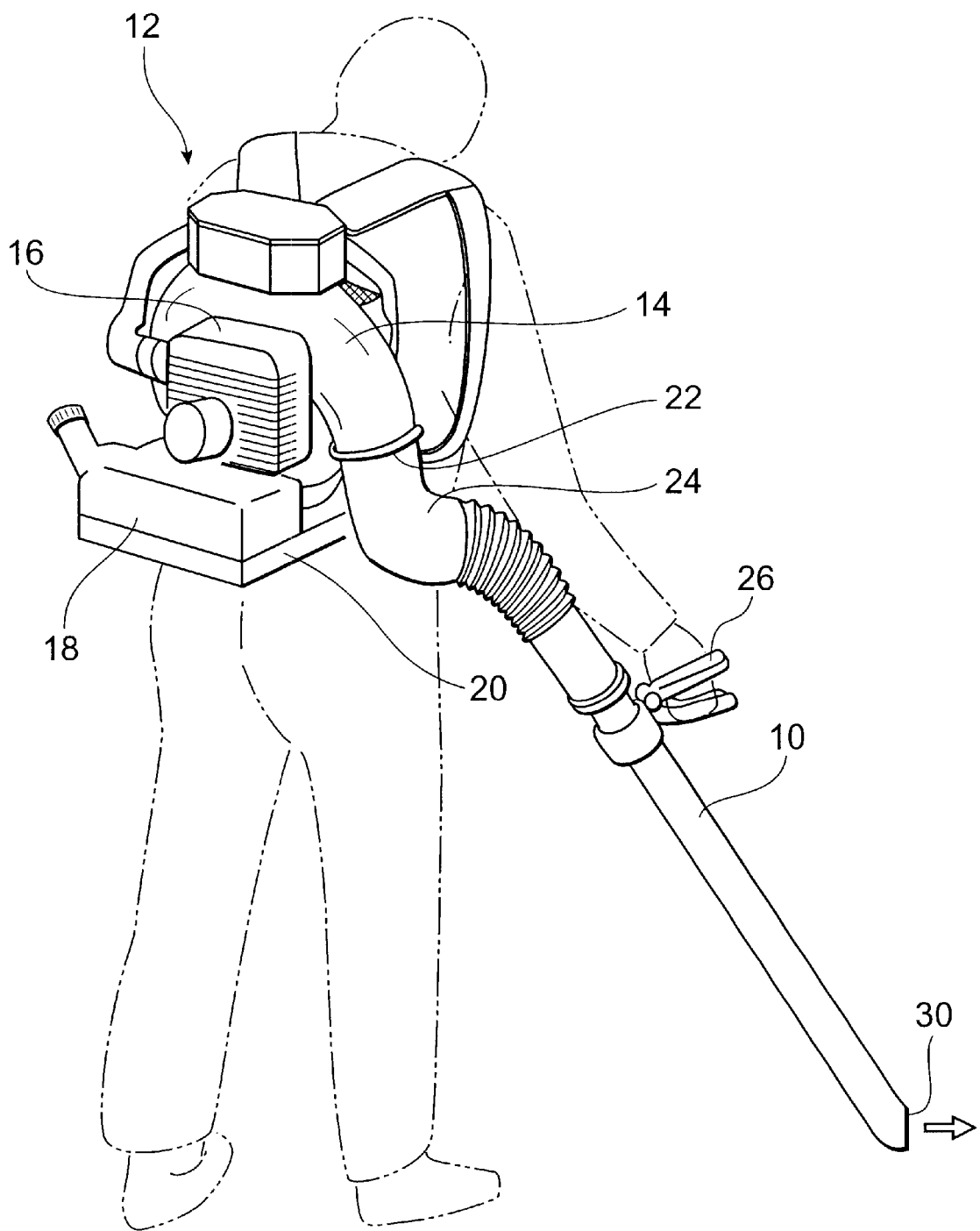
FIG. 2 is a perspective view showing an air-jet type cleaner provided with a blower tube in accordance with the present invention.

FIG. 2 shows a piggyback air-jet type cleaner 12 provided with a blower tube 10 of the present invention. The cleaner 12 comprises a centrifugal blower 14, an internal combustion engine 16 for driving the centrifugal blower 14, and a fuel tank 18 for storing the fuel for the internal combustion engine 16, which are mounted on a carrier frame 20 shouldered by an operator. The blower tube 10 in accordance with the present invention is connected to an air outlet 22 of the centrifugal blower 14 by way of a flexible tube 24. A handle 26 to be held by the operator for adjusting the direction of the front end portion of the blower tube 10 is provided on the base end portion of the tube 10.

Figure 3:
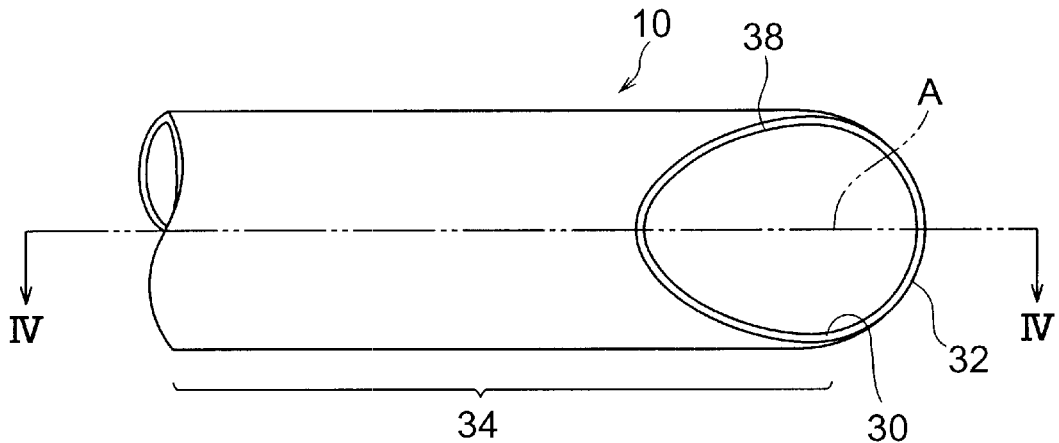
FIG. 3 is a front view showing a front end portion of the blower tube in accordance with a first embodiment of the present invention.
Figure 4:
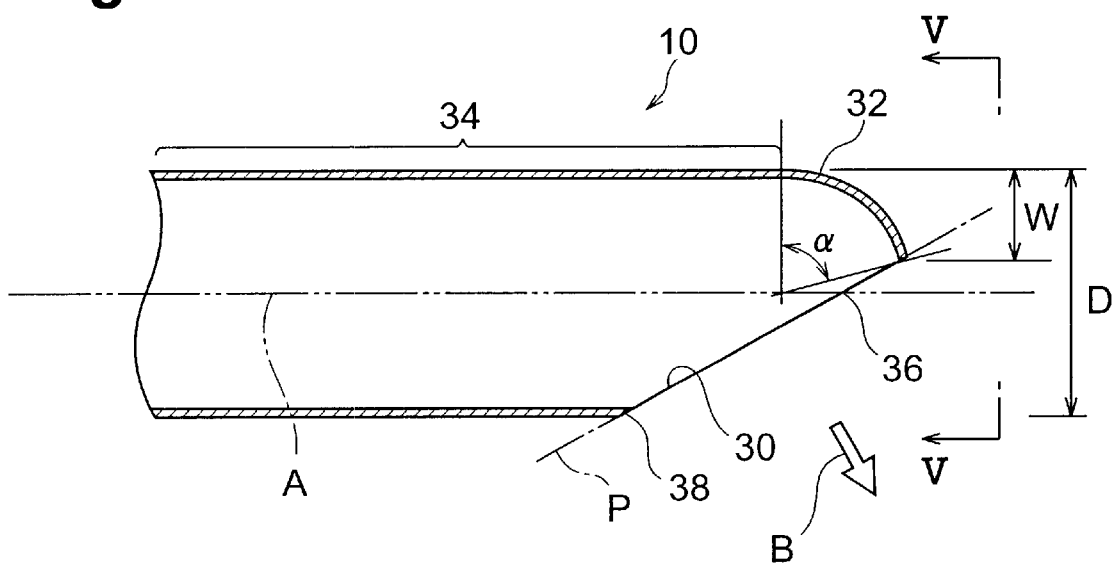
FIG. 4 is a sectional view taken along the line IV—IV of FIG. 3.
Figure 5:
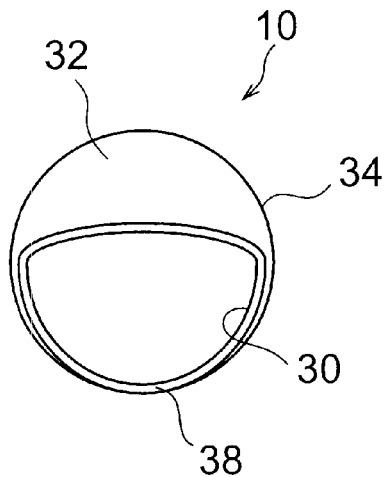
FIG. 5 is a view seen along the line V—V of FIG. 4.

FIGS. 3 to 5 show a first embodiment of the blower tube 10 in accordance with the present invention. As shown, the blower tube 10 in accordance with the first embodiment has a straight tube structure. Preferably, it is made by a molding method such as an injection-molding method from a synthetic resin and has a rigidity. The front end portion of the blower tube 10, i.e., the end portion opposite from the side connected to the blower 14, is formed with a nozzle or injection port 30 opening sideways with respect to the longitudinal axis A of the blower tube 10. Provided at the front end portion of the blower tube 10 is a deflecting part 32 for receiving the airflow flowing through the blower tube 10 along the axis A and deflecting thus received airflow toward the nozzle 30. In the first embodiment, the deflecting part 32 has a spherical inner face.

Conceptually, the front end portion of the blower tube 10 is formed as follows. Referring to FIG. 4, one end of the straight tube portion 34 of the blower tube 10 is closed into a semispherical form, and a piece of the blower tube 10 is cut out from the semispherical end by a plane P, which intersects the axis A at a point 36 near the semispherical closed portion and the plane P is slanted by a predetermined angle with respect to the axis A, whereby the front end portion having the form shown in FIGS. 3 to 5 is formed. When the profile of the outlet/nozzle 30 is seen in the side-view state (see FIG. 4), the edge 38 of the nozzle 30 is straight.

In such a configuration, if the internal combustion engine 16 is driven so as to feed air from the centrifugal blower 14 to the blower tube 10 by way of the flexible tube 24, a part of airflow will collide with the inner face of the deflecting part 32 of the front end portion of the blower tube 10, thereby deflecting toward the nozzle 30. Thus deflected part of airflow also deflects other parts of airflow which are to advance forward from the nozzle 30, whereby most of the airflow are jetted out from the nozzle 30 in the direction indicated by arrow B in FIG. 4. This jetting direction is not different from that in the conventional blower tube 1 shown in FIG. 1. Therefore, when wastes on the ground are to be blown away in the posture shown in FIG. 2, the airflow increases horizontal components, which makes it possible to carry out cleaning efficiently.

When the straight tube portion 34 and deflecting portion 32 of the blower tube 10 are projected onto a plane orthogonal to the axis A, the projected image of the deflecting portion 32 is encircled by the projected image of the straight tube portion 34. This will be understood from FIG. 5. In other words, the deflecting portion has no portions projecting sideways from the straight tube portion 34. Therefore, the front end portion of the blower tube 10 can be directly inserted into any gap that is slightly larger than the cross section of the straight tube portion 34. Once the front end portion of the blower tube 10 is inserted into such a narrow space, the blower tube 10 can freely be rotated about the axis A, so as to orient the nozzle 30 in a desirable direction. As a consequence, cleaning can easily be carried out even in a narrow space.

Figure 1:
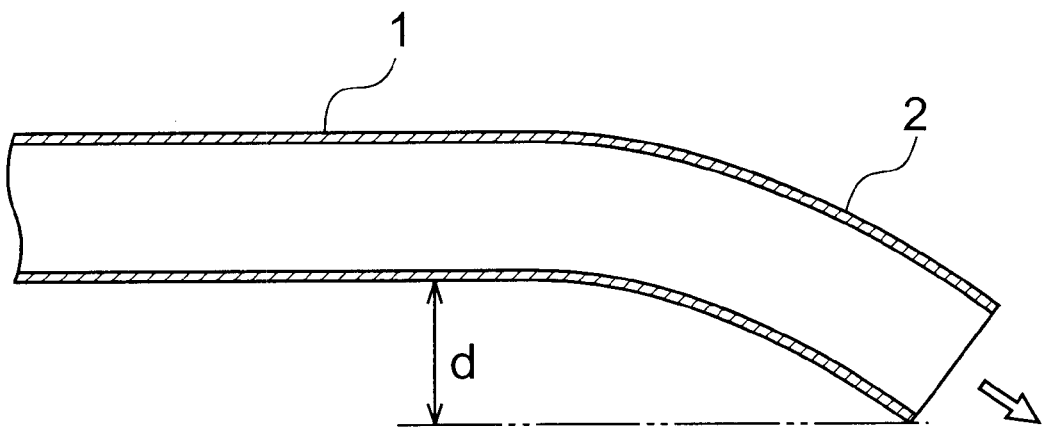
FIG. 1 is a sectional view showing a front end portion of a conventionally typical blower tube.

Further, as can be seen when FIGS. 3 to 5 are compared with FIG. 1, the die for making the blower tube 10 of the first embodiment can be made smaller than the die for making the conventional blower tube 1 shown in FIG. 1. As a result, the cost for the dies can be reduced.

For securely deflecting the airflow away from the axis A, it is preferred that the deflecting part 32 have a wider inner face. Therefore, in FIG. 4, the angle of arc a is preferably about 45 degrees to about 90 degrees.

The flow rate of airflow is typically within the range of 60 to 80 m/s. As a result of various studies, the inventors have found that, if the width W of the deflecting part 32 is at least ⅓ of the outer diameter D of the straight tube part 34 in FIG. 4 when the airflow flowing through the blower tube 10 has a flow rate falling within the above-mentioned range, then the airflow jetted out from the nozzle 30 has a very small number of components advancing forward along the axis A, whereas the most portion thereof is reliably deflected in the direction of arrow B.

Figure 6:
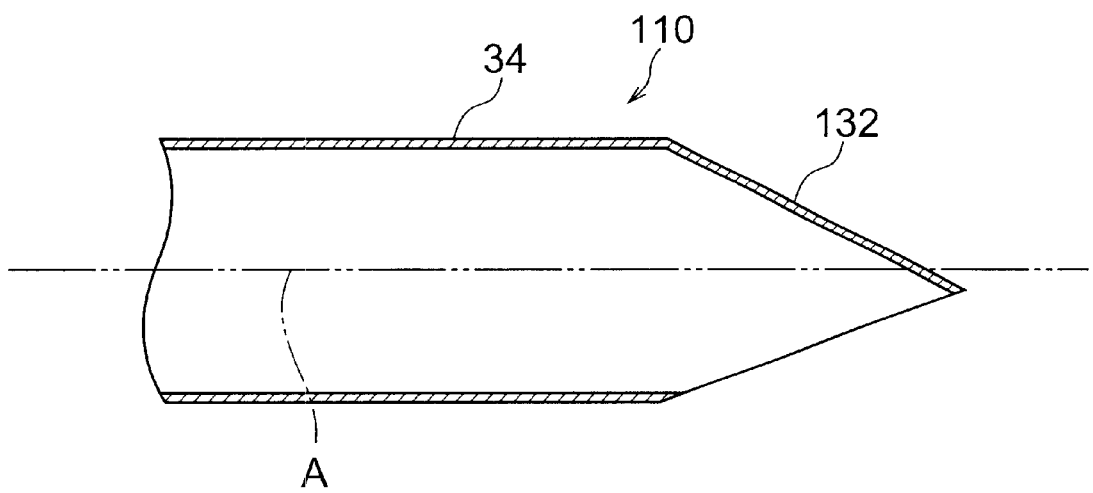
FIG. 6 is a partly sectional view showing a front end portion of the blower tube in accordance with a second embodiment of the present invention.

The form of the deflecting part and nozzle in the blower tube in accordance with the present invention is not limited to that shown in FIGS. 3 to 5. For example, in the blower tube 110 in accordance with a second embodiment shown in FIG. 6, a deflecting part 132 extending from an end of the straight tube part 34 has a slanted planar inner face. Such a form can also exhibit operations and effects similar to those of the blower tube 10 shown in FIGS. 3 to 5.

Figure 7:
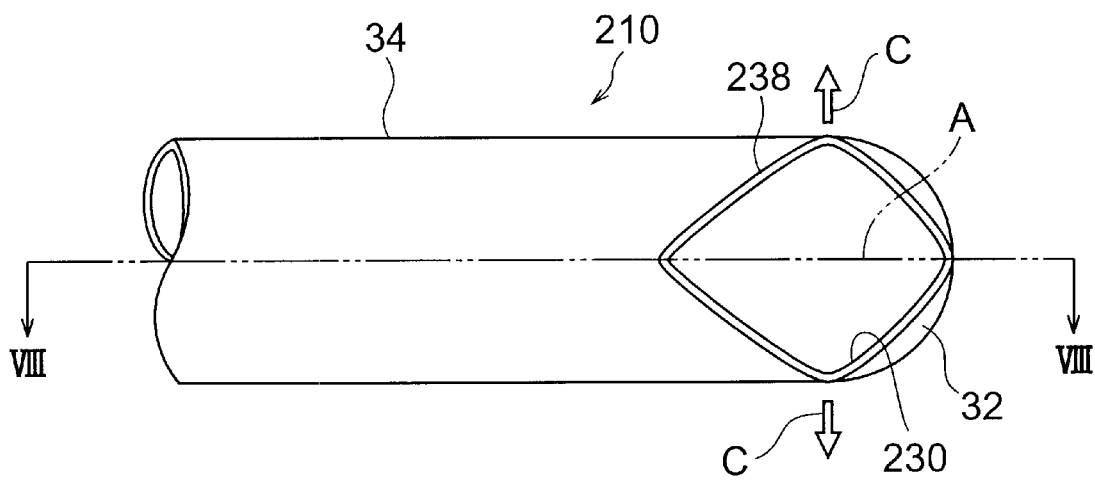
FIG. 7 is a front view showing a front end portion of the blower tube in accordance with a third embodiment of the present invention.
Figure 8:
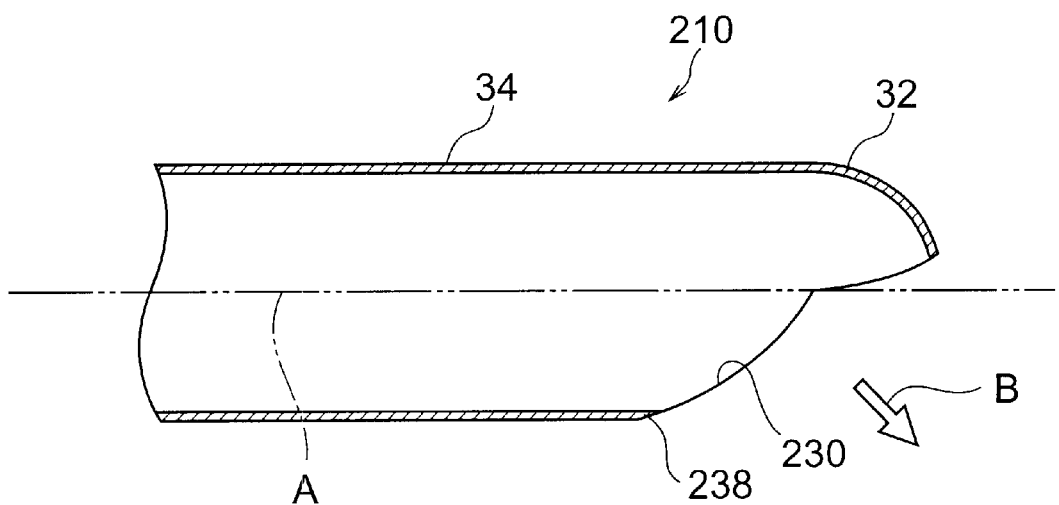
FIG. 8 is a sectional view taken along the line VIII—VIII of FIG. 7.

FIGS. 7 and 8 shows a third embodiment of the blower tube in accordance with the present invention. In the blower tube 210 in accordance with the third embodiment, the deflecting part 32 has a spherical form as in the first embodiment. However, the third embodiment differs from the first embodiment in that the side-view form of the edge 238 of the straight tube part 34 and deflecting part 32 forming the nozzle 230 (see FIG. 8) is nonlinear or nonstraight.

In the blower tube 210 in accordance with the third embodiment, the side-view form of the edge 238 is bent or curved so as to be recessed in the direction opposite from the deflecting direction. Therefore, when the nozzle 230 is seen from the front face, the edge 238 of the nozzle 230 has a substantially quadrangular form as shown in FIG. 7. The blower tube 210 having the nozzle 230 with such a form is effective in that the airflow from the nozzle 230 has a wider angle of emission, thereby flowing in the direction indicated by arrow C in FIG. 7 as well.

Figure 9:
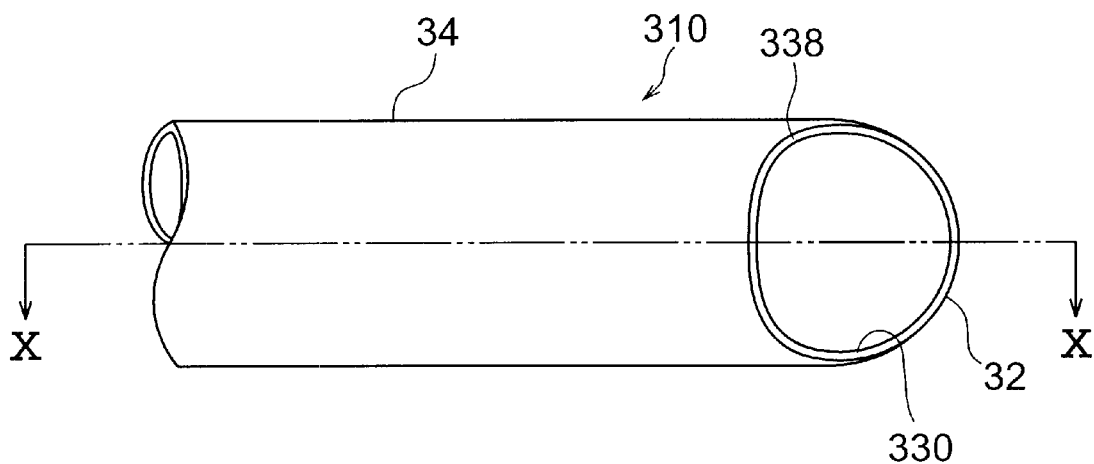
FIG. 9 is a front view showing a front end portion of the blower tube in accordance with a fourth embodiment of the present invention.
Figure 10:
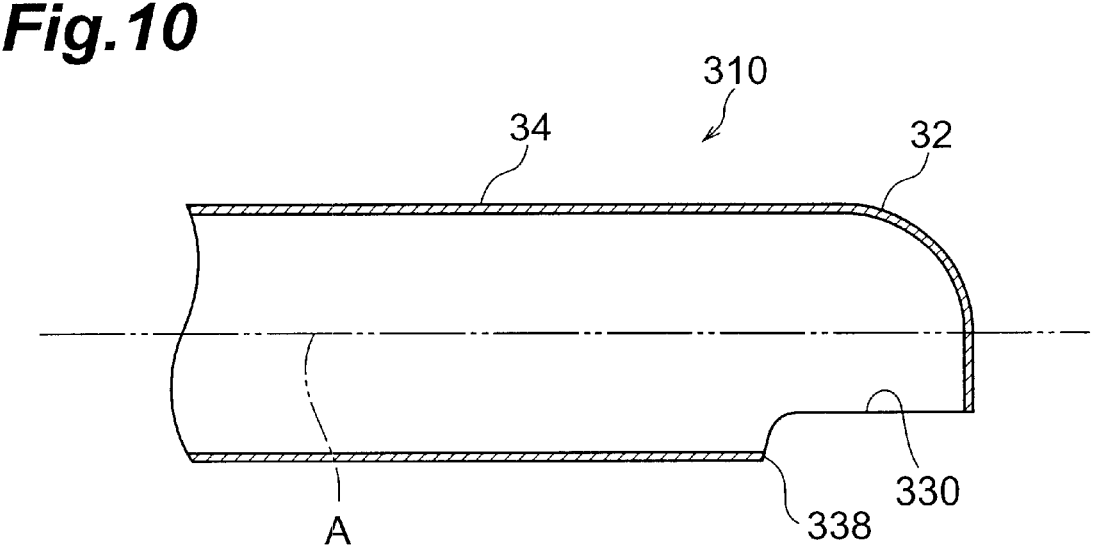
FIG. 10 is a sectional view taken along the line X—X of FIG. 9.

In the blower tube 310 in accordance with a fourth embodiment shown in FIGS. 9 and 10, most of the edge 338 defining the nozzle 330 is parallel to the axis A. This form is effective in that the airflow from the nozzle 330 forms an angle closer to the right angle with respect to the axis A.

Figure 11:
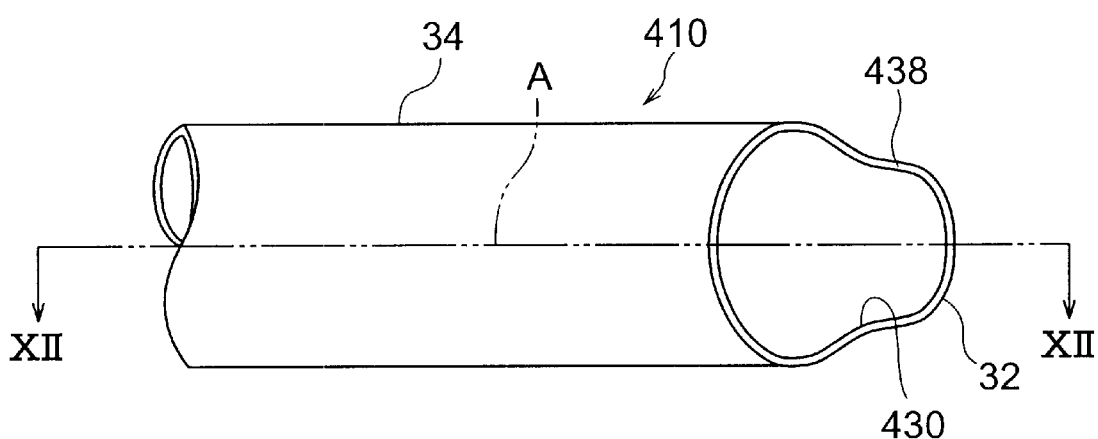
FIG. 11 is a front view showing a front end portion of the blower tube in accordance with a fifth embodiment of the present invention.
Figure 12:
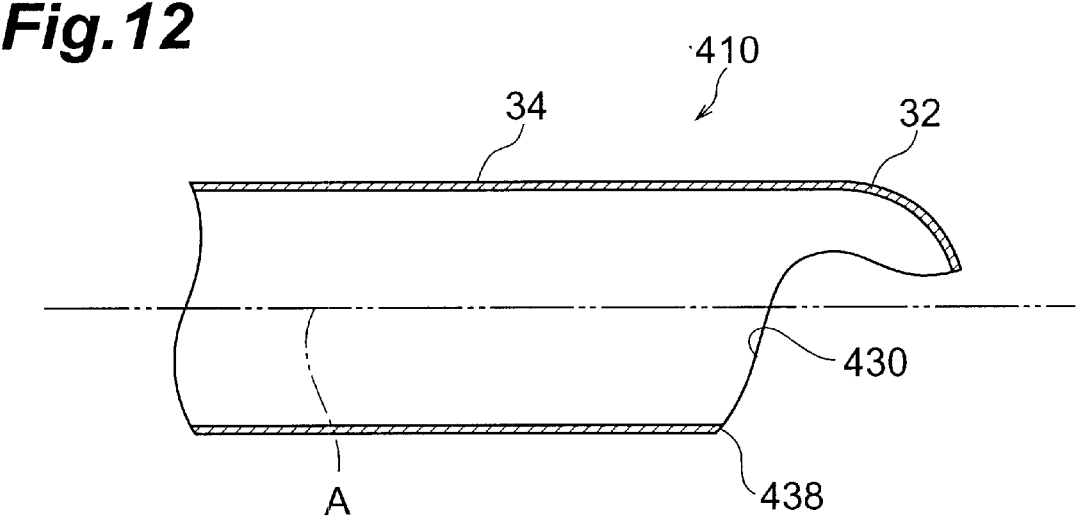
FIG. 12 is a sectional view taken along the line XII—XII of FIG. 11.

In the blower tube 410 in accordance with a fifth embodiment shown in FIGS. 11 and 12, the side-view form of the edge 438 defining the nozzle 430 (see FIG. 12) is nonlinear as in the third and forth embodiments, but is curved more greatly than those of the others. Therefore, the area of the deflecting part 32 becomes smaller, so that a part of the airflow is jetted out of the nozzle 430 in the direction of axis A.

Though preferred embodiments of the present invention are explained in detail in the foregoing, the present invention is not restricted to the above-mentioned embodiments as a matter of course. For example, though the air-jet type cleaner to which the blower tube in accordance with the present invention is applied is of a piggyback type, the present invention is also applicable to handheld type cleaners and those equipped with casters.

It is not necessary for the whole blower tube excluding the deflecting part to be a rigid straight tube. For example, it may have a structure bendable at its middle portion.

The form of the nozzle of the blower tube may appropriately be altered depending on its use, whereby various forms can be considered other than those of the above-mentioned embodiments.

The cross-sectional form of the straight tube part of the blower tube is not limited to circles, and is not required to be identical throughout the straight tube part.

In the blower tube in accordance with the present invention, as explained in the foregoing, the airflow jetted out of the nozzle is directed sideways, whereby wastes on the ground can efficiently be cleaned as in the conventional blower tube having a curved front end portion. Also, since the front end portion of the blower tube has no portions protruding sideways, it can be inserted into a narrow space. As a consequence, working areas can widen greatly.

Since the front end portion is not curved, the die for making the blower tube can be made smaller, whereby the cost for the die and, consequently, the cost for making the blower tube can be cut down.

Further, the blower tube in accordance with the present invention is effective in that, when being packed, the box for packing it can be made smaller, which makes it easier to transport and store.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. A blower tube adapted to be connected to an air outlet of a blower, said blower tube comprising:
   a straight tube portion having a first end and a second end, said straight tube portion adapted to be connected to said air outlet of said blower via said first end; and
   a deflecting portion, gradually extending from said second end of said straight tube portion, for deflecting an airflow from said straight tube portion away from a direction along a longitudinal axis of said straight tube portion,
   wherein an outlet for jetting out said airflow deflected by said deflecting portion is defined by said straight tube portion and said deflecting portion, and
   wherein projection of the blower tube onto a plane perpendicular to said longitudinal axis produces an image no larger than a similar projection image of said straight tube portion.

2. blower tube according to claim 1, wherein an edge of said outlet lies substantially on a plane.

3. A blower tube according to claim 1, wherein said deflecting portion has a concave inner face.

4. A blower tube according to claim 1, wherein said deflecting part has a planar inner face.

5. A blower tube according to claim 1, wherein said deflecting portion extends inward to a distance that is at least ⅓ of the outer diameter of said straight tube portion in a side view along a direction perpendicular to a direction of said deflected airflow and said longitudinal axis.

6. A blower tube comprising:
   a straight tube portion having
      a first end adapted to connect to a blower, and
      a second end having an outlet; and
   a deflecting portion gradually extending from the second end for deflecting airflow away from a direction along a longitudinal axis of the straight tube portion,
   wherein a longitudinal cross section bisecting the blower tube produces a first edge and a second edge, wherein the first edge is straight, the second edge is longer than the first edge, and, at the second end, the second edge extends towards the first edge but does not extend beyond a line extending from the first edge.

7. The blower tube of claim 6, wherein the outlet is formed such that an edge of the outlet is substantially on a plane that is not perpendicular to a longitudinal axis of the straight tube portion.

8. The blower tube of claim 6, wherein the deflecting portion has a concave inner surface.

9. The blower tube of claim 6, wherein a distance between a tip end of the second edge and the line extending from the first edge is less than two thirds of a diameter of the straight tube portion of the blower tube.

* * * * *